United States Patent [19]

Lederman

[11] Patent Number: 5,101,946
[45] Date of Patent: Apr. 7, 1992

[54] CAGE PHASED ROLLER CLUTCH WITH IMPROVED ROLLER SHIFTING

[75] Inventor: Frederick E. Lederman, Sandusky, Ohio

[73] Assignee: General Motors Corporation, Detroit, Mich.

[21] Appl. No.: 753,459

[22] Filed: Sep. 3, 1991

[51] Int. Cl.⁵ .............................................. F16D 41/06
[52] U.S. Cl. .................................................... 192/45
[58] Field of Search ................ 192/45, 44; 188/82.84

[56] References Cited

U.S. PATENT DOCUMENTS

| 2,532,670 | 12/1950 | LaBrie | 188/18 |
| 3,392,601 | 7/1968 | Roper | 74/711 |
| 4,828,086 | 5/1989 | Lederman | 192/45 |
| 4,854,435 | 8/1989 | Kitamura et al. | 192/41 A |
| 4,867,292 | 9/1989 | Hartig | 192/41 A |
| 4,901,833 | 2/1990 | Lederman | 192/45 |
| 4,998,605 | 3/1991 | Ferris | 192/41 A |

FOREIGN PATENT DOCUMENTS 1242825  8/1971  United Kingdom ................ 192/45

Primary Examiner—Rodney H. Bonck
Attorney, Agent, or Firm—Patrick M. Griffin

[57] ABSTRACT

A passively actuated, cage phased roller clutch improves the timing and accuracy of the roller shift by providing each cage pocket with an individual cushioning unit that maintains continual, resilient contact with both sides of the roller. Roller shifting is immediate, since there is no roller-pocket play. In addition, the particular shape for the cushioning unit disclosed has resilient side walls that wrap around the roller and pulls it up and out of rubbing contact with the pathway during overrun, keeping the rollers in a uniform lockup ready position.

3 Claims, 4 Drawing Sheets

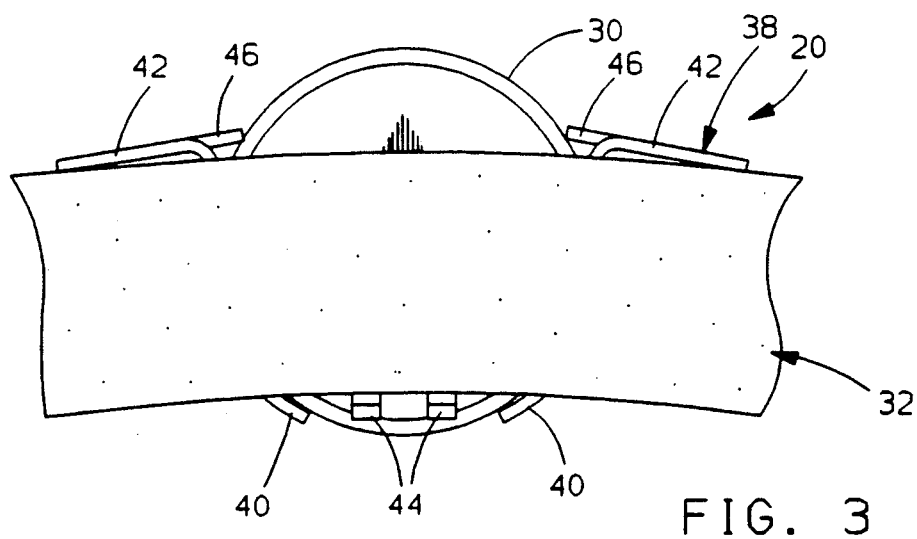
FIG. 3
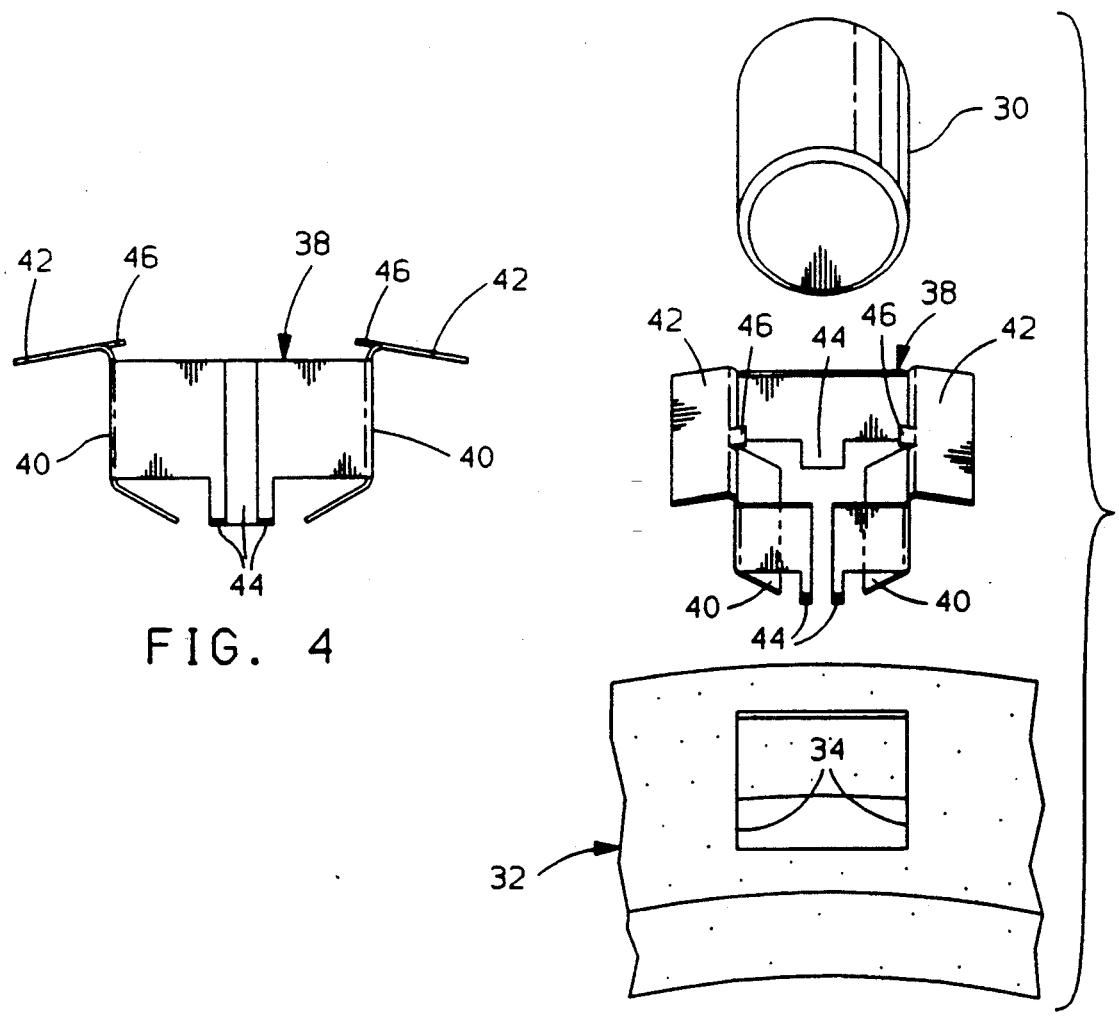
FIG. 4
FIG. 5

CAGE PHASED ROLLER CLUTCH WITH IMPROVED ROLLER SHIFTING

This invention relates to roller clutches in general, and specifically to a cage phased roller clutch in which roller shifting is accomplished with improved accuracy.

BACKGROUND OF THE INVENTION

The most common overrunning roller clutch is the type in which a roller retaining cage is anchored to the cam race. The cage includes a series of box shaped pockets, each of which contains a cylindrical roller and an accordion energizing spring. Each pocket sits over the longer leg of a V-shaped notch, the so-called cam ramp. The energizing springs push off of the fixed cage to keep each roller pushed into constant light contact with both the cam ramp and the pathway race. Each spring can rapidly and independently expand and contract to keep its roller in this lockup ready position, thereby compensating for any running eccentricity between the races. Since each cage pocket must be wide enough to carry a roller and spring, the number of rollers that can be incorporated is limited.

In another, less common, type of roller clutch, the cage is not anchored to the cam race, but is instead twisted relative to the cam race in order to force all of the rollers at once in one direction or the other along the cam ramps, so-called "cage phasing". Occasionally, the cage is actively twisted by an external actuator, such as a piston. More often, the cage is passively twisted by an internal drag means, such as drag springs, that ride between the pathway race and the cage. Typically, in a passively actuated cage phased roller clutch, each pocket contains only a roller, so that a greater number of rollers can be incorporated. In operation, one edge of each roller pocket pushes a respective roller toward lockup position. When the races shift to free running mode, the drag spring twists the cage in the opposite direction, carrying the rollers down the cam races toward the cam hooks, so that they cannot wedge between the races.

There are shortcomings in the conventional passively actuated cage phased roller clutch design. The rollers cannot be fitted tightly between the edges of the roller pockets without retarding their rolling, so there is some pocket edge-roller play. Furthermore, manufacturing tolerances in the cage mean that the pocket edge spacing differs from pocket to pocket, as does the roller-pocket edge play. The position of the roller during overrun, its lockup ready position, is determined only by the loose confinement of the rollers in its pocket. With nothing to compensate, the cage may not shift all the rollers simultaneously and evenly. Nor is there anything to cushion the pocket edges from direct collision with the rollers when they do shift. Also, during overrun, the rollers can rub on the relatively rotating pathway, though this is true of most cam carried roller clutches, as well. The lack of individual energizing springs also means there is nothing to retain the rollers in the cage pockets before the cage is installed between the clutch races, making installation more difficult.

SUMMARY OF THE INVENTION

The invention provides an improved, passively actuated, cage phased overrunning roller clutch that shifts the rollers more evenly.

The preferred embodiment disclosed includes conventional races and a typical pocketed cage with pathway riding drag springs. However, the edges of the cage pockets do not act directly on the rollers. Instead, each pocket is lined with a cushioning unit that is fitted between the pocket edges. Each unit has a pair of radially extending spring steel side walls that are slanted toward one another, wrapping partially down and around the curvature of a roller. Each roller is therefore captured between the side walls in a resilient force equilibrium, and cushioned from direct contact with the pocket edges. The side walls act to continually squeeze and lift the roller up, radially outwardly toward its respective cam ramp.

During clutch overrun, when the races are rotating freely, the squeezing force of the cushioning units pulls each roller to the bottom of one V-shaped notch in the cam race, where it is held in a predictable and accurate lockup ready position. The rollers are thereby lifted away from contact with the moving pathway, reducing drag and wear. When the races reverse direction, the cumulative force of the drag springs overcomes the force of the resilient side walls, and twists the cage in a direction that shifts each roller down a cam ramp until it is wedged between the races. The cage twisting force is applied indirectly to the rollers, by the side walls of the cushioning units, which are assured of being in continual contact with all of the rollers, regardless of any gaps between the cage pocket edges and the rollers. That assured cage-roller contact, in conjunction with the uniform roller lockup ready position, gives an immediate, even roller shifting. In addition, in the embodiment disclosed, the cushioning units are designed to retain the rollers in the cage pockets prior to installation.

It is, therefore, a general object of the invention to provide a cage phased roller clutch that cushions and protects the cage pocket edges from direct contact with the rollers.

It is another object of the invention to provide such a roller clutch that shifts the rollers more evenly, compensating for gaps between the rollers and the pocket edges.

It is another object of the invention to maintain each roller in an accurate, uniform lockup ready position when the races overrun.

It is another object of the invention to keep each roller out of rubbing contact with the pathway during overrun.

It is still another object o the invention to provide such a roller clutch improved by the addition of a cushioning unit in each roller pocket that requires no alteration to the cage, to the rollers, or to the races.

It is still another object of the invention to provide a cushioning unit for each pocket that has a pair of resilient side walls that capture each roller in a force equilibrium that maintains each roller at the bottom of a V-shaped notch of the cam race during overrun, and which applies the shifting force of the cage indirectly to the rollers as the races move to lockup.

It is yet another object of the invention to provide such a cushioning unit that retains the rollers to the cage prior to installation between the races.

DESCRIPTION OF THE PREFERRED EMBODIMENT

These and other objects and features of the invention will appear from the following written description, and from the drawings, in which:

FIG. 1 an end view of the roller clutch of the invention installed between a pair of clutch races;

FIG. 2 an enlarged section of just the races, without the roller clutch between;

FIG. 3 is an enlarged section of just the roller clutch of the invention, before it is installed between the races;

FIG. 4 is a side view of a cushioning unit alone;

FIG. 5 is an exploded perspective view of one roller, one pair of cage pocket edges, and one cushioning unit;

Figure 6:
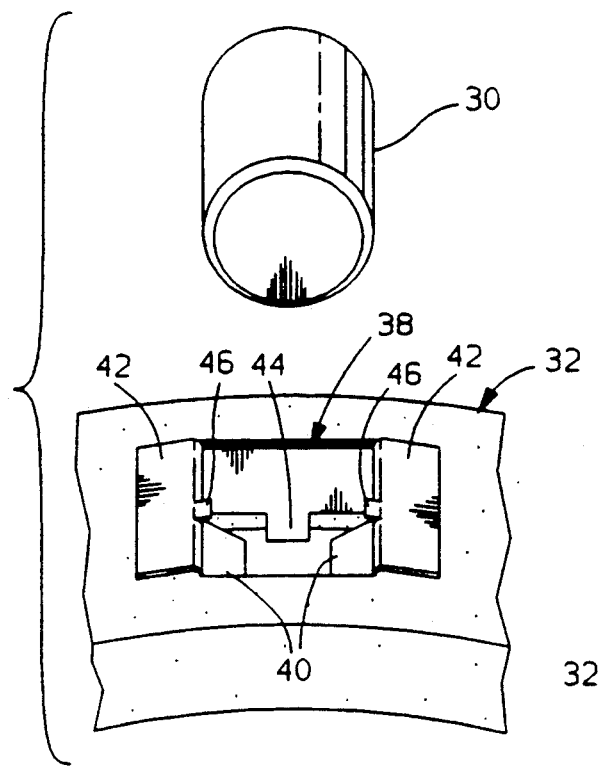
Figure 7:
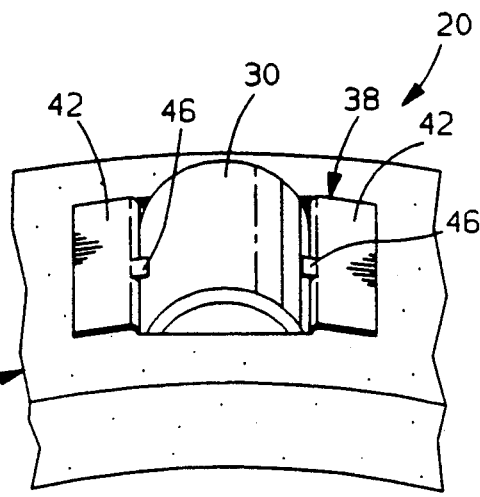
Figure 8:
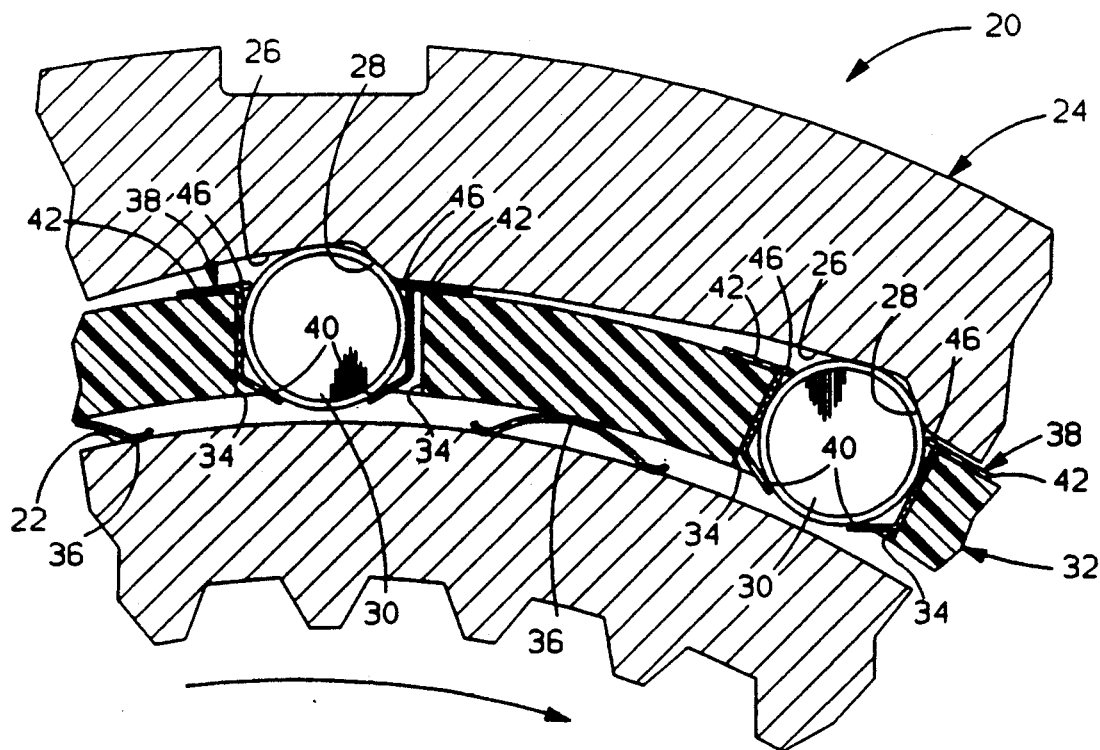
Figure 9:
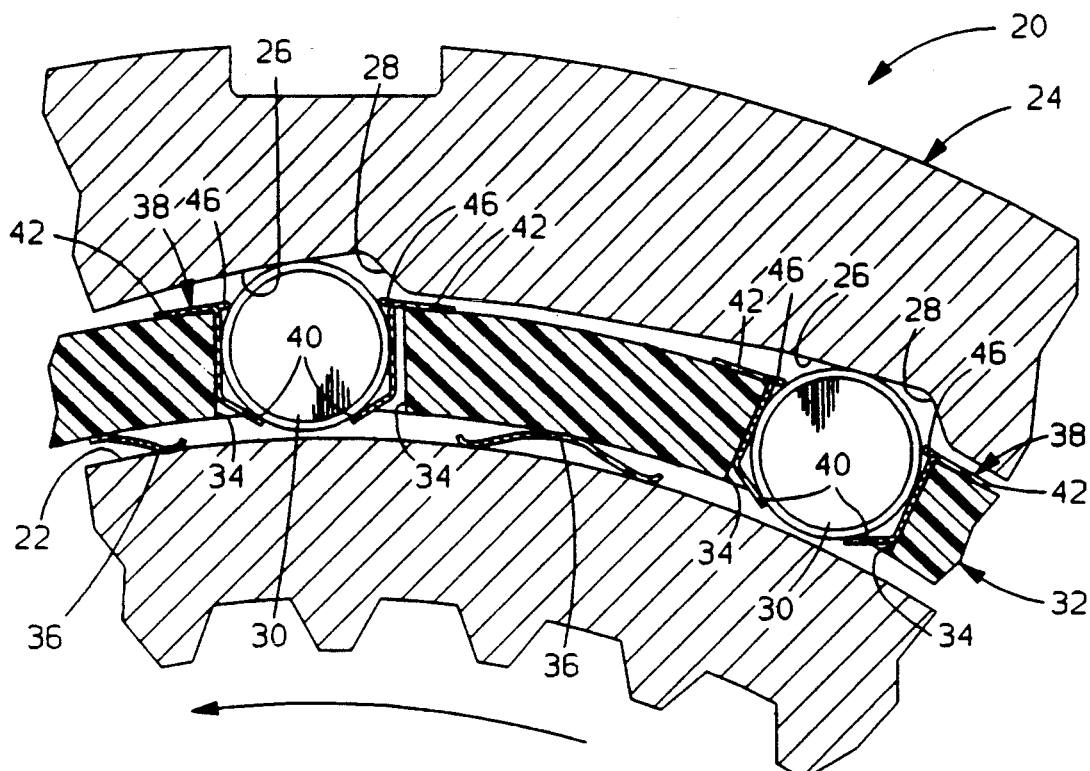
Figure 10:
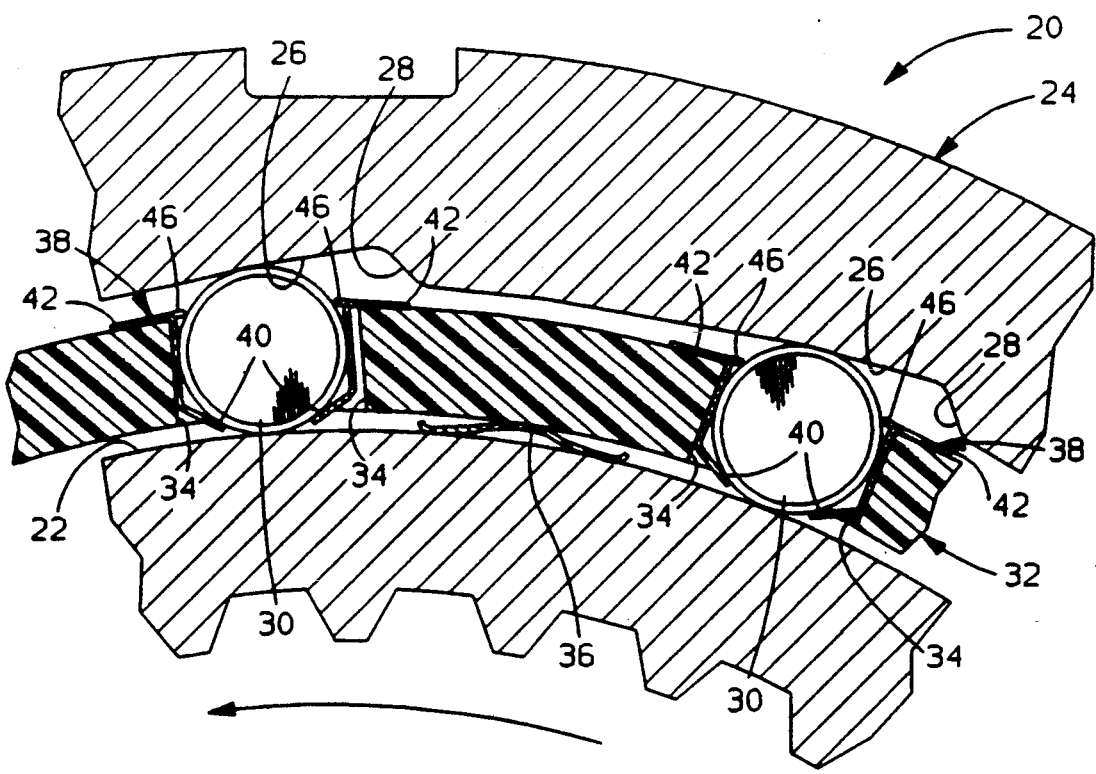

FIG. 6 a view similar to FIG. 5, but showing the cushioning unit installed between the pocket edges;

FIG. 7 is a view similar to FIG. 6, but showing the roller installed as well;

FIG. 8 is a cross section of the installed roller clutch, with the rollers shown in elevation, when the clutch is overrunning;

FIG. 9 is a view like FIG. 8, but showing the roller clutch in the process of shifting from overrun to lockup;

FIG. 10 is a view like FIG. 9, but showing the clutch fully locked up.

Figure 1:
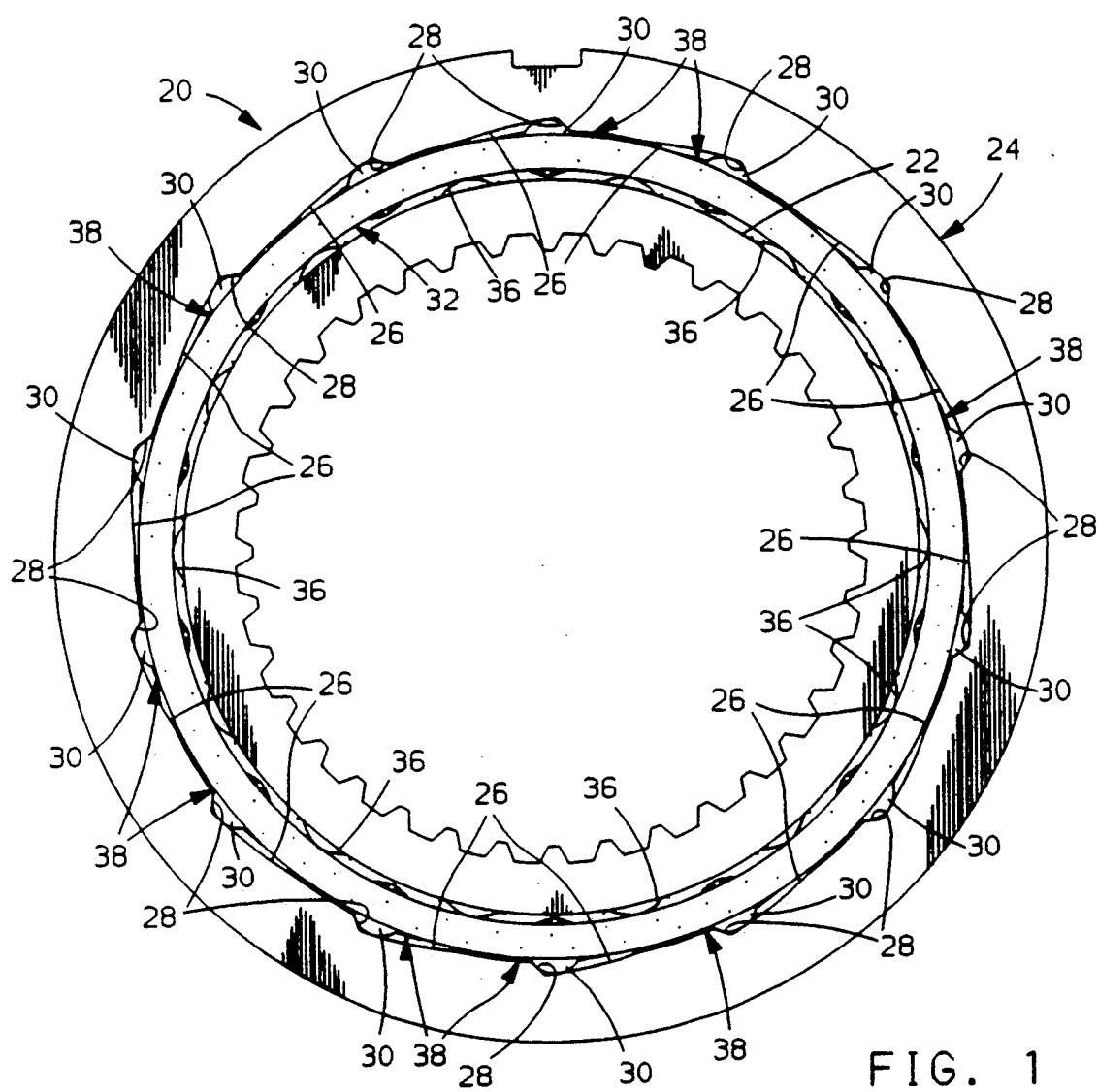
Figure 2:
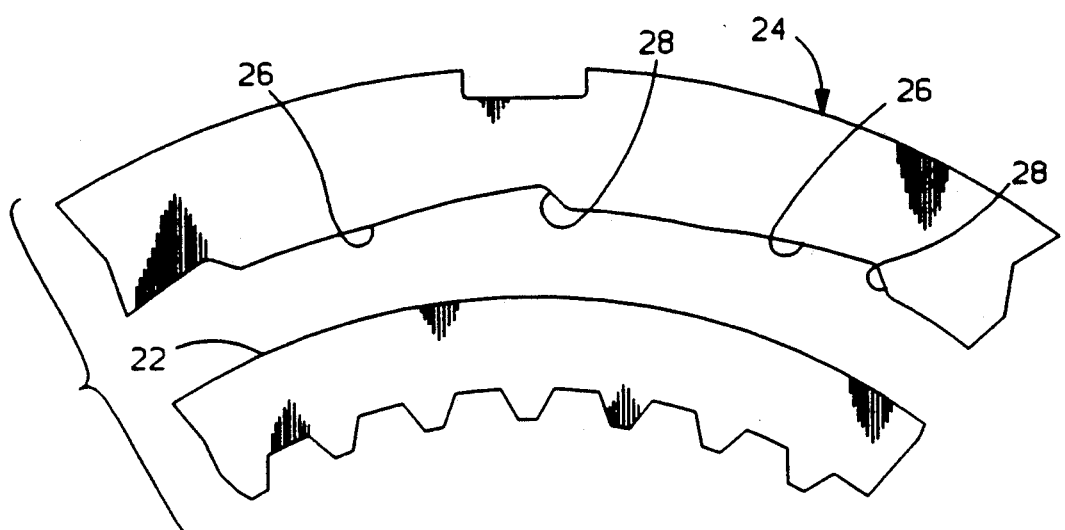

Referring first to FIGS. 1 and 2, the improvement of the invention is incorporated in a conventional cage phased overrunning roller clutch, indicated generally at 20. A coaxial pair of relatively rotatable clutch races includes a cylindrical inner pathway race 22 and an outer cam race, indicated generally at 24. Cam race 24 has a series of asymmetrical V-shaped notches, each of which is defined by a longer sloped cam ramp 26 that merges into a shorter and more steeply sloped cam hook 28. The cam ramps 26 face the pathway race 22, creating a series of wedges within which a series of cylindrical rollers 30 are located. If pushed toward the narrow end of the wedge, the rollers 30 create a lockup condition, but allow free relative race rotation if pushed toward the wide end. The invention provides for an improved shifting of the rollers 30.

Referring to FIGS. 1 and 5, a cylindrical cage, indicated generally at 32, includes a series of evenly spaced pockets defined by pairs of pocket edges 34, which are separated by slightly more than the diameter of a roller 30. Attached to the underside of cage 32, between each adjacent pair of pocket edges 34, is a generally U-shaped drag spring 36 that is compressed against the pathway race 22. The drag springs 36 translate to cage 32 some portion of the force with which pathway race 22 rotates relative to cam race 24. Ordinarily, the rollers 30 would be shifted in one direction or the other directly, by the pocket edges 34, as the cage 32 was twisted in one direction or the other. Because of the gaps between the pocket edges 34 and the rollers 30, it could not then be assured that every roller 30 was in contact with an edge 34 when roller shifting began. Furthermore, due to ordinary manufacturing tolerances, the pairs of pocket edges 34 can vary in separation or width, which would exacerbate the uneven roller shifting. The invention improves roller shifting with no alteration to cage 32.

Referring next to FIGS. 4 through 7, the invention provides an individual cushioning unit, indicated generally at 38, for each roller 30. Each cushioning unit 38 is stamped and folded from a spring steel blank into a general box shape that fits closely between a pair of pocket edges 34. A pair of inwardly slanted, resilient side walls 40 depend radially inwardly from a pair of upper flanges 42. The side walls 40 are long enough to extend past the central axis of a roller 30, and are inwardly bent at the ends so as to conform to and partially wrap the sides of a roller 30. Also, in their free state, pre-installation condition, the side walls 40 are spaced apart by less than the diameter of a roller 30. Three outwardly bent barbs 44 at the bottom are designed to grab onto cage 32, and two short tabs 46 are lanced out of the upper flanges 42. Each cushioning unit 38 is first pushed firmly down between a pair of pocket edges 34 until the lower barbs 44 snap into place, which leaves the upper flanges 42 under some tension. Next, a roller 30 is pushed down past the tabs 46 and between the side walls 40, parting them from the free state. The rollers 30 are thereby retained to cage 32, trapped between the tabs 46 above and the wrapping side walls 40 below. The completed clutch 20 can then be installed as a unit between the races 22 and 24.

Referring next to FIG. 8, the completed clutch 20 is shown in overrun, when the pathway race 22 is rotating clockwise relative to a stationary cam race 24. Each roller 30 is in continual contact between a respective pair of resilient side walls 40. A force equilibrium is reached as each roller 30 is squeezed between the side walls 40, thereby being held slightly away from, and cushioned from, both pocket edges 34. This is in contrast to a conventional cage, where the rollers could rattle back and forth between the pocket edges. Furthermore, because the side walls 40 wrap down and around the roller 30, below its center axis, each roller 30 is continually pulled upwardly, or radially outwardly. Consequently, each roller 30 seeks a stable position, which puts it at the peak intersection of the cam ramp 26 and cam hook 28, as shown. Stated differently, if the rollers 30 were displaced to the center of the cam ramps 26, they would tend to roll down and return to the FIG. 8 position, carrying the cage 32 clockwise. The drag springs 36 act in the same direction, rubbing on the pathway race 22 and twisting the cage 32. The cage 32 does not push directly on the rollers 30, however, as is described in more detail below. The twisting force is not enough to pull the rollers 30 off of the much steeper cam hooks 28, however, so the rollers 30 remain lifted up and away from rubbing contact with the pathway race 22, in a stable, low drag, predictable lockup ready position.

Referring next to FIGS. 9 and 10, the change from overrunning to lockup is illustrated. When pathway race 22 reverses direction and runs counterclockwise, the drag springs 36 now twist cage 32 in the same relative direction. Simultaneously, the side wall 40 on the right hand side of each roller 30 rolls it along its respective cam ramp 26 until it hits pathway race 22, jamming and locking the races 22 and 24 together for co rotation. The rollers 30 are not retarded in their rolling motion by rubbing contact with the side walls 40, any more than they would be by direct contact with the pocket edges 34. The prevention of direct contact between the rollers 30 and the pocket edges 34 provides several advantages. The action of the cage 32 on the rollers 30 is cushioned, but immediate, with no lost motion due to the varying gaps described above. The shifting of the rollers 30 is even, because there is continual contact between all the rollers 30 and a pair of side walls 40, and each starts from a predictable and stable lockup ready position. The same advantages apply when the clutch 20 switches back from lockup to overrun, with the left hand side walls 40 then acting on the rollers 30 to shift them back up the cam ramps 26.

Variations of the preferred embodiment could be made. Any drag means that translated some portion of the relative rotation of the pathway race 22 to the cage 32 could provide the necessary cage shifting force, although springs like 36 are generally the most economic means. A simpler shape for the cushioning unit 38 could be devised. For example, if the resilient side walls 40 were inwardly slanted, but straight, so as not to wrap down and around the roller 30 as shown, they would still maintain continual, cushioned contact with the roller 30. However, they would not tend to scoop the roller 30 up and off of the pathway race 22 during overrun. It is no more expensive to stamp the shape of the side walls 40 as shown, however, which yields the additional advantage of the no drag, uniform lockup ready position for each roller 30. There may be applications, however, where that is not necessary, as where both races rotate at fairly high speed during overrun, so that the rollers are thrown out to the bottom of the V-shaped notches and away from the pathway, anyway. Without the barbs 44 and the tabs 46, the cushioning units 38 would still operate the same way after installation, but would not be retained to the cage 32 before. These are essentially cost free features to add, however, and greatly simplify shipping, handling and installation. The short tabs 46 are particularly cost effective, because they cooperate with the wrapping shape of the side walls 40 to retain the rollers 30. Therefore, it will be understood that it is not intended to limit the invention to just the embodiment disclosed.

The embodiments of the invention in which an exclusive property or privilege is claimed are defined as follows:

1. In an overrunning clutch of the type that operates between a pathway race and a relatively rotatable cam race that rotate freely in one direction and lockup in another direction, said cam race having an evenly spaced series of cam ramps and a complement of cylindrical rollers, each of which is located over a respective cam ramp, and in which said clutch is phased by a cage that drags on said pathway race so as to shift said rollers along said cam ramps, and in which each of said rollers is retained over its respective cam ramp by circumferentially spaced edges of individual roller pockets in said cage, the improvement comprising,
    a plurality of cushioning units, one fixed to each pocket, each of said cushioning units having a pair of radially extending resilient side walls interposed between said pocket edges and a respective roller, each of which is biased toward the other side wall so as to closely capture said roller between them in a resilient force equilibrium so that said cage can indirectly shift said rollers along said cam ramps in either direction, through said interposed side walls, thereby cushioning said pocket edges from said rollers.

2. In an overrunning clutch of the type that operates between a pathway race and a relatively rotatable cam race that rotate freely in one direction and lockup in another direction, said cam race having an evenly spaced series of generally V-shaped notches comprised of shallow cam ramps and steeper cam hooks, and a complement of cylindrical rollers, each of which is located over a respective cam ramp, and in which said clutch is phased by a cage that drags on said pathway race so as to shift said rollers along said cam ramps, and in which each of said rollers is retained over its respective cam ramp by circumferentially spaced edges of individual roller pockets in said cage, the improvement comprising,
    a plurality of cushioning units, one fixed to each pocket, each of said cushioning units having a pair of inwardly slanted resilient side walls interposed between said pocket edges and a respective roller, each of which side walls wraps partially around a side of said roller and is biased toward the other so as to closely capture said roller between them in a resilient force equilibrium that pulls each of said rollers to the intersection of its respective cam ramp and cam hook when said races rotate freely, thereby maintaining each roller in a uniform lockup ready position from which said cage can indirectly shift said rollers in one direction along said cam ramps and into contact with said pathway when said races lockup, and in the other direction when said races overrun, through said interposed side walls, thereby cushioning said pocket edges from said rollers and assuring an even, simultaneous shift of said rollers.

3. An overrunning clutch of the type that operates between a pathway race and a relatively rotatable cam race that rotate freely in one direction and lockup in another direction, said cam race having an evenly spaced series of cam ramps, comprising,
    a complement of cylindrical rollers, each of which is located over a respective cam ramp,
    a cage having a plurality of pairs of circumferentially spaced pocket edges, each pair of which locates a roller over a respective cam ramp,
    drag means for translating the relative motion of said pathway into a twisting force on said cage, and,
    a plurality of cushioning units, one fixed between each pair of cage pocket edges, each of said cushioning units having a pair of radially extending resilient side walls interposed between said pocket edges and a respective roller, each of which is biased toward the other side wall so as to closely capture said roller between them in a resilient force equilibrium so that said cage can indirectly shift said rollers along said cam ramps in either direction as it is twisted by said drag means, through said interposed side walls, thereby cushioning said pocket edges from said rollers.

* * * * *